(12) United States Patent
D'Souza et al.

(10) Patent No.: US 11,587,191 B2
(45) Date of Patent: Feb. 21, 2023

(54) SYSTEMS AND METHODS FOR A CONTACTLESS VISITOR CHECK-IN

(71) Applicant: Walmart Apollo, LLC, Bentonville, AR (US)

(72) Inventors: Derric D'Souza, Bentonville, AR (US); Danika Alleen Goecke, Lowell, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 54 days.

(21) Appl. No.: 17/039,152

(22) Filed: Sep. 30, 2020

(65) Prior Publication Data
US 2022/0101469 A1 Mar. 31, 2022

(51) Int. Cl.
*G06Q 50/26* (2012.01)
*G06Q 30/018* (2023.01)
*G06Q 10/1093* (2023.01)
*G07C 9/29* (2020.01)
*H04L 9/08* (2006.01)
*G06F 3/12* (2006.01)
*G06K 7/14* (2006.01)

(52) U.S. Cl.
CPC ......... *G06Q 50/265* (2013.01); *G06F 3/1204* (2013.01); *G06F 3/1268* (2013.01); *G06K 7/1417* (2013.01); *G06Q 10/1095* (2013.01); *G06Q 30/0185* (2013.01); *G07C 9/29* (2020.01); *H04L 9/088* (2013.01); *G06F 3/1292* (2013.01); *G06Q 2220/00* (2013.01)

(58) Field of Classification Search
None
See application file for complete search history.

(56) References Cited

U.S. PATENT DOCUMENTS

| 8,626,120 | B2 | 1/2014 | Amora et al. | |
|---|---|---|---|---|
| 9,508,207 | B2 * | 11/2016 | Kalb | G07C 9/00571 |
| 9,747,566 | B2 | 8/2017 | Ng et al. | |
| 2017/0161670 | A1 * | 6/2017 | Ng | G06Q 10/063114 |
| 2019/0319940 | A1 * | 10/2019 | Hamel | H04L 9/3271 |

OTHER PUBLICATIONS

AirAsia enhances digital self check-in as part of safety procedures prior to resumption of flights May 25, 2020.

* cited by examiner

*Primary Examiner* — Frantz Bataille
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform one or more processors and perform: transmitting an invitation to a mobile application on a mobile device of a user, wherein the invitation authorizes the mobile application on the mobile device to be used to check-in to a facility; generating, by a visitor application, an image that is displayed on a kiosk at an entrance of the facility; receiving, from the mobile device, image data of the image, as scanned by the mobile application from the kiosk, and mobile application data; validating whether the mobile application data and the image data satisfy one or more criteria; and when the one or more criteria are satisfied, authorizing the user to access the facility. Other embodiments are disclosed.

20 Claims, 7 Drawing Sheets

SYSTEMS AND METHODS FOR A CONTACTLESS VISITOR CHECK-IN

TECHNICAL FIELD

This disclosure relates generally relates to a contactless visitor check-in.

BACKGROUND

Conventional processes of checking in to a facility can involve a manual method of accessing an electronic interface and/or through interaction with an employee of the facility. Such processes can be time consuming due to the complexity of computer-processes searching for information related to each user requesting access to the facility, and such manual methods might present health risks during a COVID-19 pandemic.

BRIEF DESCRIPTION OF THE DRAWINGS

To facilitate further description of the embodiments, the following drawings are provided in which.

Figure 1:
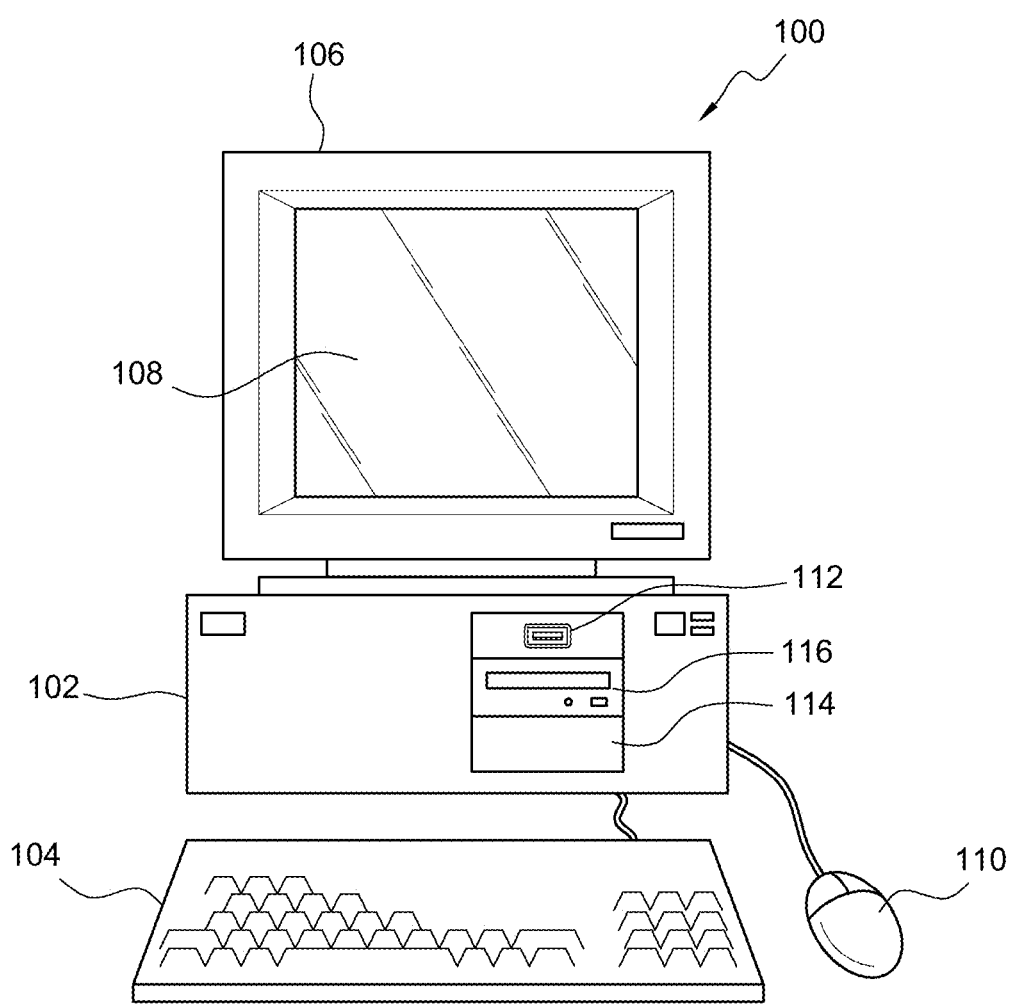
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In many embodiments, a contactless check-in system can be used to authorize a user to access a facility to attend a meeting set for a date and a time. An option to use the contactless check-in system can include a confirmation of a valid invitation.

Figure 2:
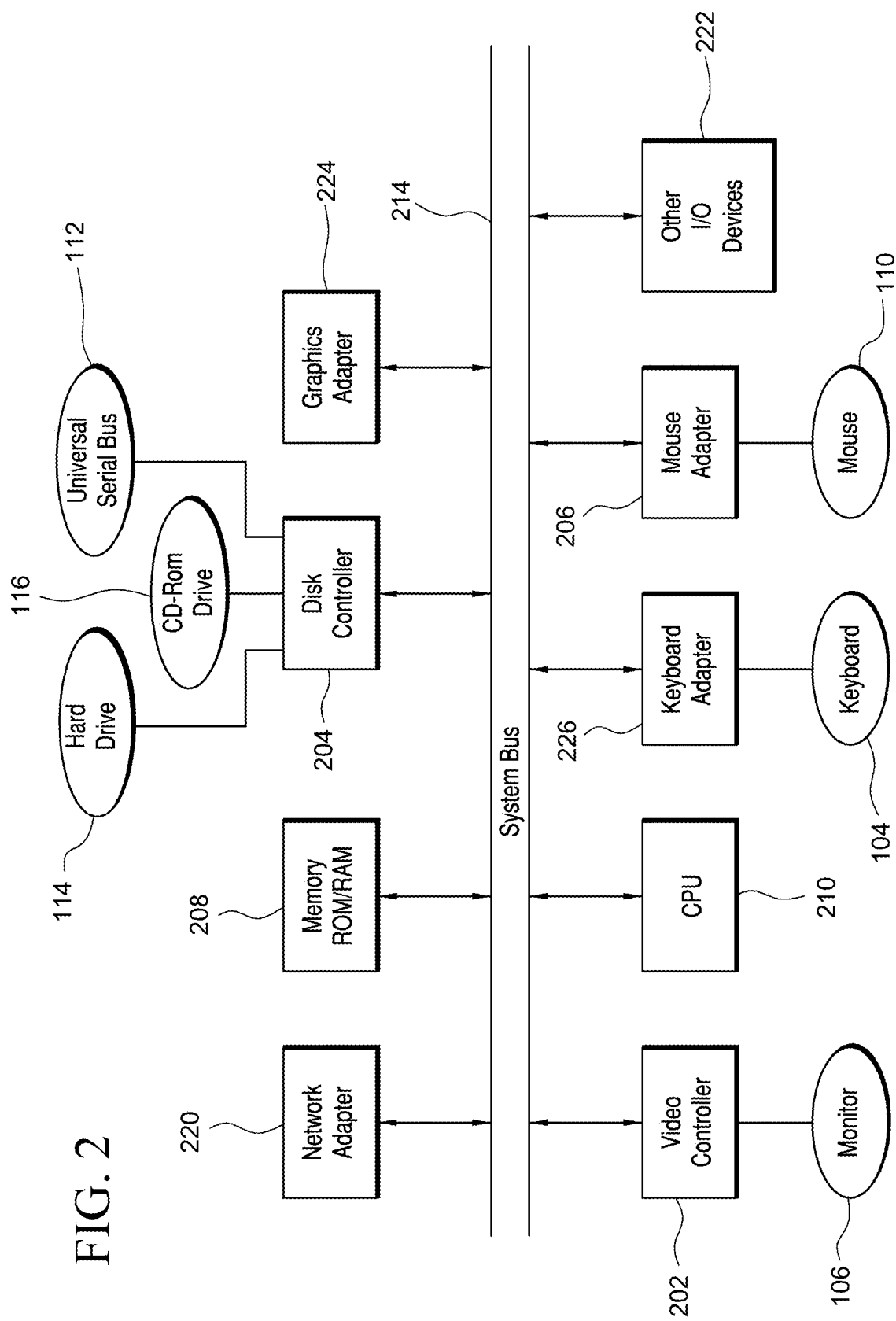
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
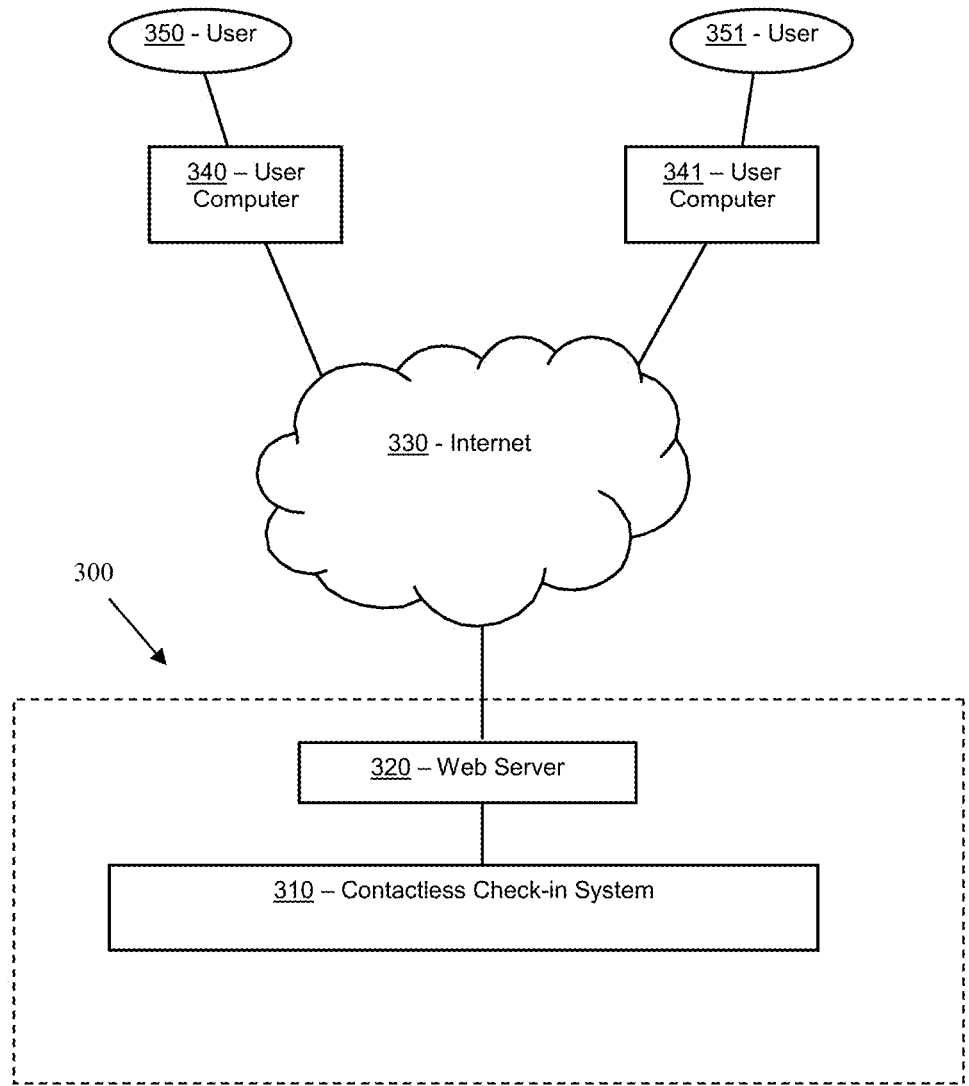
FIG. 3 illustrates a block diagram of a system that can be employed for a contactless visitor check in, according to an embodiment.

Turning ahead in the drawings, FIG. 3 illustrates a block diagram of a system 300 that can be employed for a contactless check-in system at a facility, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a contactless check-in system 310 and/or a web server 320. Contactless check-in system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, contactless check-in system 310 and/or web server 320. Additional details regarding contactless check-in system 310 and/or web server 320 are described herein.

In a number of embodiments, each of contactless check-in system 310 and/or web server 320 can be a special-purpose computer programed specifically to perform specific functions not associated with a general-purpose computer, as described in greater detail below. Also, although not shown in the drawings, in some embodiments, contactless check-in system 310 can include webserver 320.

In some embodiments, web server 320 can be in data communication through Internet 330 with one or more user computers, such as user computers 340 and/or 341. Internet 330 can be a public network, a private network or a hybrid network. In some embodiments, user computers 340-341 can be used by users, such as users 350 and/or 351, which also can be referred to as customers, in which case, user computers 340 and 341 can be referred to as customer computers. In many embodiments, web server 320 can host one or more sites (e.g., websites), in addition to other suitable activities.

In some embodiments, an internal network that is not open to the public can be used for communications between contactless check-in system 310 and/or web server 320 within system 300. Accordingly, in some embodiments, web server 320 (and/or the software used by such systems) can refer to a back end of system 300, which can be operated by an operator and/or administrator of system 300, and check-in system 310 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and/or 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, contactless check-in system 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to contactless check-in system 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of contactless check-in system 310 and/or web server 320. In a similar manner, the processors and/or the non-transitory computer-readable media can be local and/or remote to each other.

Meanwhile, in many embodiments, contactless check-in system 310 and/or web server 320 also can be configured to communicate with and/or include one or more databases and/or other suitable databases. The one or more databases can include an item database that contains information about items or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between contactless check-in system 310 and/or web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, contactless check-in system 310 can be a general-purpose computer or a special-purpose computer programmed to perform specific functions and/or applications. In the same or different embodiments, contactless check-in system 310 can include a kiosk and/or another suitable computing device.

Figure 4:
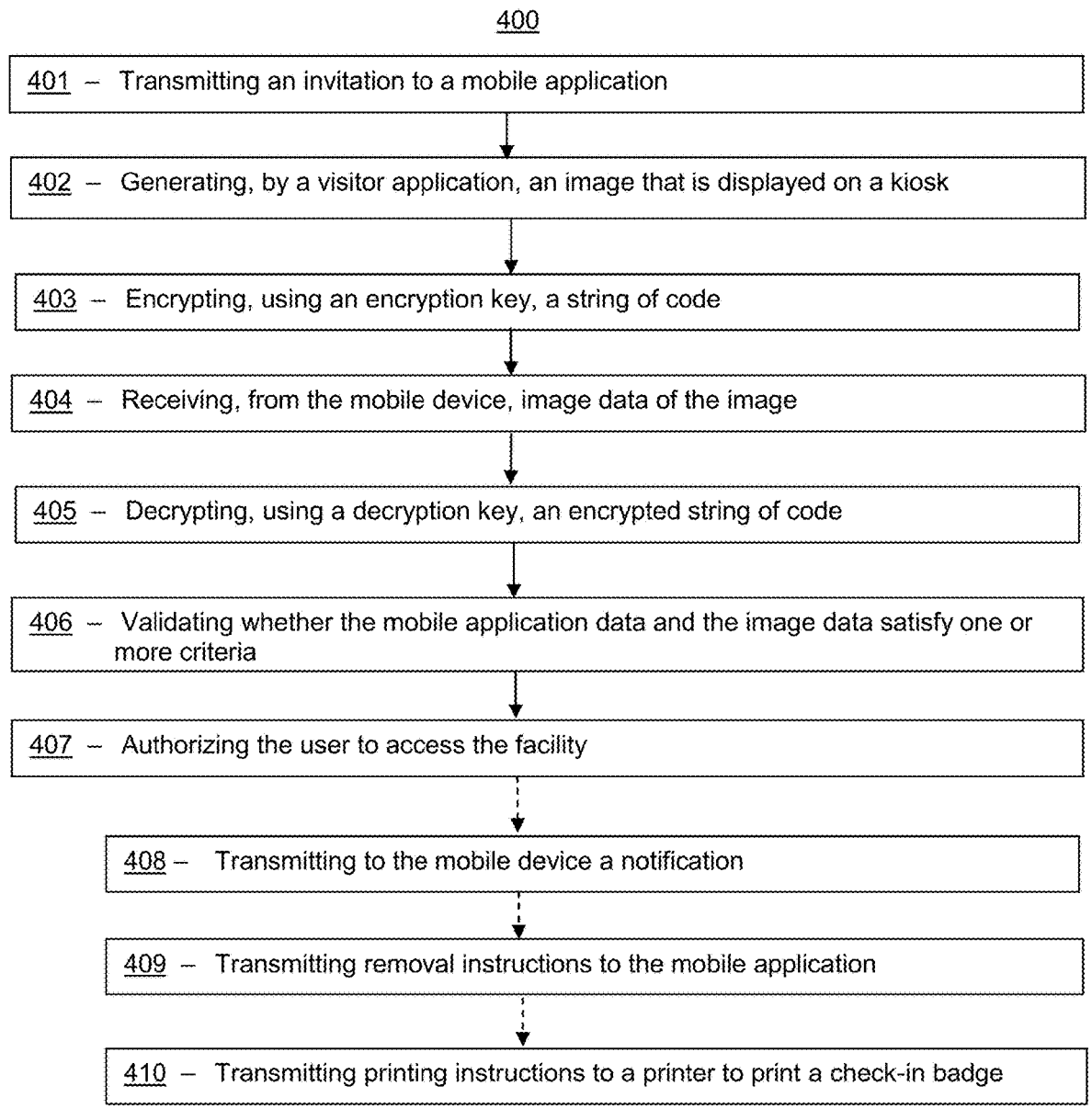
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically authorizing a user to access a facility using a contactless check-in system. In many embodiments, authorizing a user to access a facility can be implemented using an image displayed on a kiosk or a desktop computer, a mobile computing device and/or any suitable electronic device to perform the processes and methods presented herein. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as contactless check-in system 310 (FIG. 3) and/or web server 320 (FIG. 3). The processor(s) can be similar or identical to the processor(s) described above with respect to computer system 100 (FIG. 1).

Referring to FIG. 4, method 400 can include a block 401 of transmitting an invitation to a mobile application. The mobile application can be on a mobile device of a user, and the invitation can authorize the mobile application on the mobile device to be used to check-in to a facility. In several embodiments, the invitation can be for a meeting at the facility (e.g., building) and can be required to use the contactless check-in system. In many embodiments, an invitation can be sent to a user (e.g., an invited visitor) by an authorized person (e.g., an employee at the facility) on behalf of the facility. In some embodiments, the invitation can be sent to the user before or after the user downloads the mobile application to the mobile device of the user. In several embodiments, receiving the invitation can include a user accessing the invitation by downloading the mobile application to a mobile device of the user where the invitation can be displayed on the interface of the mobile application. In some embodiments, prior to visiting the facility, a user can enroll or set up an account with identifier information in the mobile application which can be saved for future utilization. The information can include an identification of the user, an identification of the mobile device of the user, and/or other suitable user information.

In some embodiments, the mobile application can generate a unique user (e.g., visitor) identification (ID) for a user saved on the mobile application that can be used to identify the user and/or link the user ID to a meeting invitation.

In several embodiments, the invitation for a meeting can include a date, a time, and a location for the meeting and can be designed (e.g., by software code) to expire upon satisfying one or more conditions. In many embodiments, once a meeting time ends or expires, the contactless check-in option can no longer be available or used on the mobile application to check-in to the facility. In a number of embodiments, the one or more conditions of expiration can include the end of the meeting, cancellation of the meeting, and/or other suitable conditions. A valid invitation for a meeting can include a prior time before a start time of the meeting up until the time the meeting has ended, a start time of the meeting to the end of the meeting, a facility where the meeting has been scheduled, a location within the facility where the meeting has been scheduled, a date of the meeting, a user (e.g., an invitee) named on a list of attendees for the meeting, an identity of the authorized user (e.g., an inviter) that authorized the user to access the facility, and/or other suitable conditions for a meeting.

In some embodiments, a user can check-in to the facility using the contactless check-in system within a pre-determined period of time prior to the start of the meeting up until the end of the meeting. For example, a meeting set for 9:00 a.m. on a date, can allow the user to check-in 30 minutes prior to the start of the meeting. Further, a user also can check-in to the facility at any time after the start of the meeting up until the end of the scheduled meeting time. Thus, in many embodiments, the invitation displayed on the mobile application is valid and available for use to check-in to a facility for a scheduled meeting for a period of time before the meeting begins up until the end of the meeting period.

In various embodiments, a valid invitation can be displayed or presented on an interface of the mobile application in more than one way, such as: (1.a) highlighted on the interface indicating a valid invitation; (1.b) dimmed, crossed-out, or removed from the interface for an expired or invalid invitation; (2.a) an icon symbolizing a valid invitation; (2.b) a different icon symbolizing an expired or invalid invitation; (3) a code indicating a valid, invalid, or expired invitation after scanning a code from a kiosk; and/or (4) another suitable indicator. In some embodiments, the invitation can include details for one or more meetings, a start time and an end time on a certain date for each meeting, a location for each meeting, and/or other suitable meeting details. In several embodiments, a user can receive more than one invitation for a single date for more than one meeting or more than one facility location, all to be displayed on the interface of the mobile application. In many embodiments, the invitation can be automatically removed from the interface of the mobile application upon meeting one or more conditions or events. Such conditions or events for immediate removal of the invitation from the interface can include successfully checking in to the facility, an expiration of the meeting time, a determination that the invitation is no longer valid, a determination that the invitation is fraudulent, a determination that the mobile application is corrupted, a determination that the mobile device is offline or broken, and/or other suitable such conditions or events.

Figure 6:
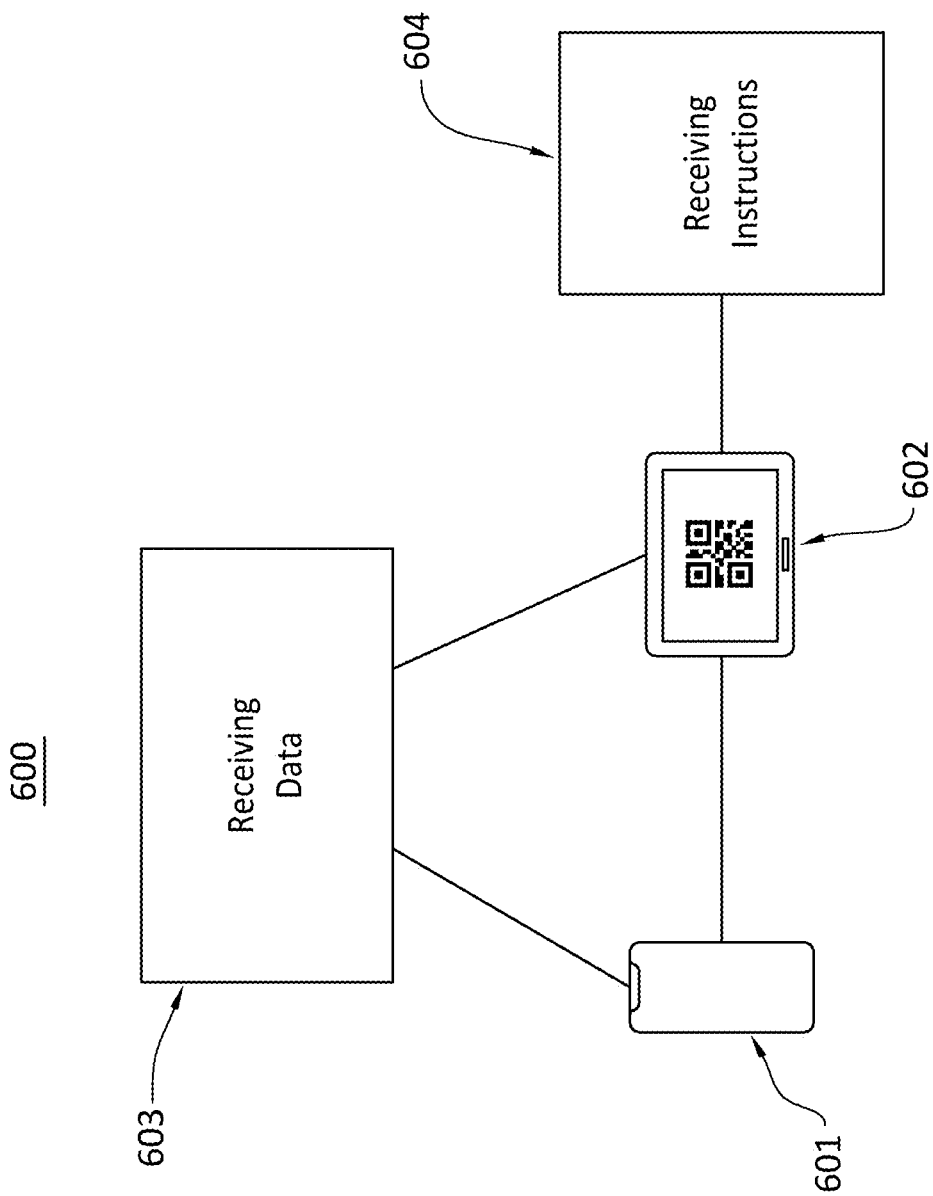
FIG. 6 illustrates a flow chart diagram for a method according to another embodiment.
Figure 7:
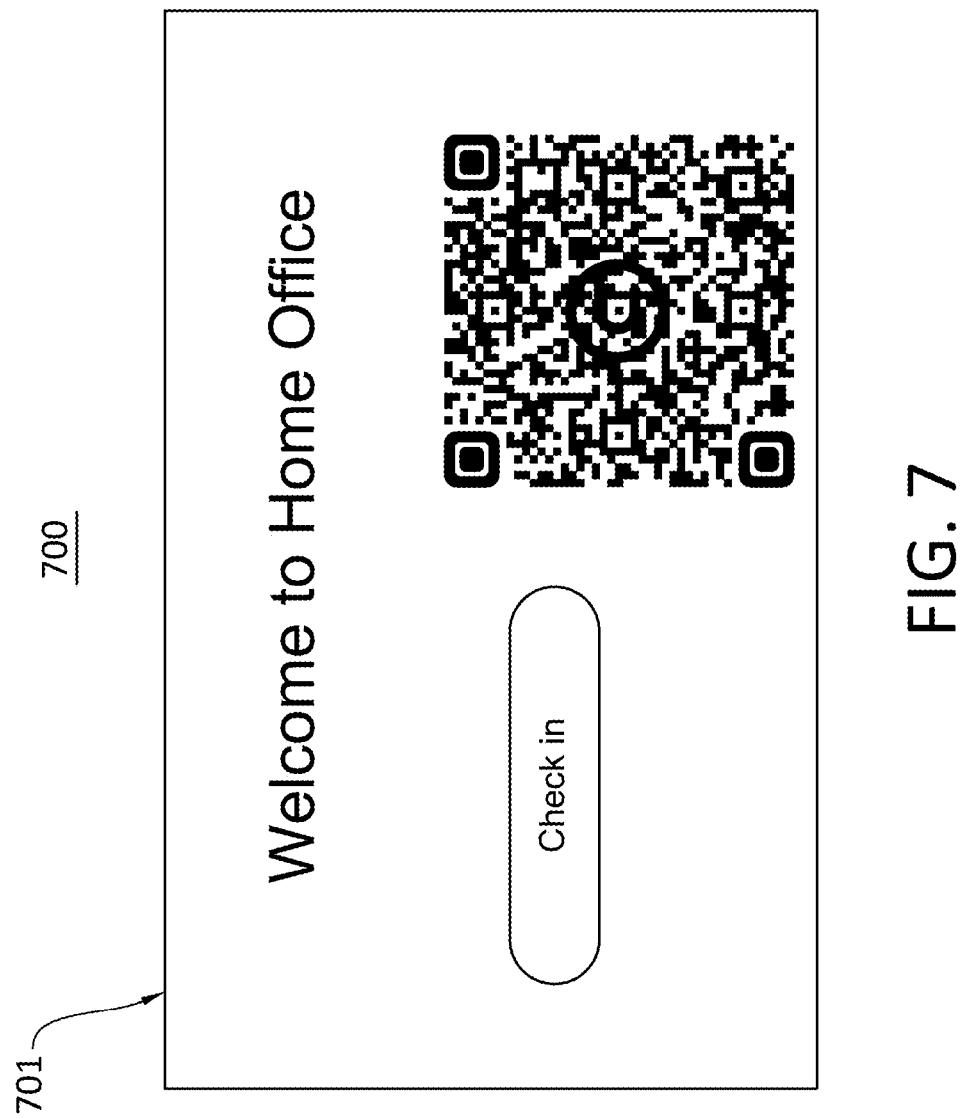
FIG. 7 illustrates an exemplary interface display.

In various embodiments, method 400 also can include a block 402 of generating, by a visitor application, an image that is displayed on a kiosk. The kiosk can be located at an entrance of the facility. In some embodiments, the kiosk can have two check-in options displayed: a manual check-in option or the contactless check-in option, as shown in FIG. 7, as described below. In many embodiments, upon arrival at the kiosk location, a user can open the mobile application on the user's mobile device, and use the mobile application to scan the image on the kiosk to open (e.g., initiate) the contactless check-in process, which can be similar or identical to block 602 (FIG. 6, as described below).

In some embodiments, using the image to initiate the contactless check-in process can include requiring a valid invitation displayed on the interface of the mobile application. This requirement can be advantageous to provide a security measure ensuring the identity of the user and/or the mobile device of the user. In other words, in these embodiments, a user with the mobile application downloaded onto the mobile device of the user cannot use the mobile application to scan the image on the kiosk to initiate the contactless check-in process unless (1) the mobile application has received an invitation that corresponds to the user credentials entered into the mobile application, and (2) the check-in date, time, facility, and kiosk match those same details in the invitation.

In many embodiments, the visitor application can include performing multiple processes and procedures in addition to generating the image, such as communicating with the mobile application of the mobile device of the user, refreshing the image on the kiosk, transmitting instructions to a printer, and/or other suitable tasks related to the contactless check-in approach herein. In the same or different embodiments, the visitor application can be a software program run on a computer or an application or "app" run on a tablet.

In several embodiments, the kiosk can be located in a lobby and/or near an entrance of the facility where the user plans to check-in at or before the meeting time and date. In a number of embodiments, the kiosk can be set up with identification information of a unique organization, a particular facility location, a unique kiosk identifier, a combination of two or more of these identifiers, and/or other suitable identifiers to confirm the kiosk location and identification. In some embodiments, a kiosk can be paired with an onsite printer system at the facility using such pairing techniques as Bluetooth technology, WiFi, Ethernet, or some other method of communication approach.

In several embodiments, the kiosk can generate an image or dynamic image displayed on the interface or homepage of the kiosk, such as a QR code, to allow a user to scan and/or interface with the dynamic image to initiate the check-in process, similar to the interface shown in 701 (FIG. 7, as described below). In many embodiments, the image or the dynamic image can be generated by the kiosk in real-time and customized to identify the location of the kiosk, a location of a facility at which the kiosk is located, and a specific entrance of the facility at which the kiosk is located that can advantageously act as an additional security measure for the facility. In various embodiments, the kiosk can communicate with a cloud computing environment and the mobile application, and can be paired with a printer.

In some embodiments, the dynamic image can be automatically updated for display on the kiosk on a continuous, real-time basis when the kiosk is online, during predetermined time intervals, and/or during periods of time when the kiosk is idle (e.g., offline, in sleep mode) to refresh the image data. In many embodiments, the image or dynamic image can be updated simultaneously when the kiosk comes back online to ensure each scan of the image or dynamic image contains an independent and/or different date and time stamp that can be stored as part of the image data in the image. The terms dynamic image and image can be interchangeable under appropriate circumstances such that the embodiments of the apparatus, methods, and/or articles of manufacture described herein are, for example, capable of operation in other embodiments than those illustrated or otherwise described herein.

In many embodiments, the image data of the image can include a current date, a current time, an identification of the kiosk, an identification of the facility, and/or an identification of an entrance of the facility. In several embodiments, the current date and current time can be created using the Coordinated Universal Time (UTC) primary time standard to normalize the date and time that the image is scanned and/or validated (e.g., confirmed), and to avoid issues with different times in different time zones.

In some embodiments, method 400 additionally can include a block 403 of encrypting, using an encryption key, a string of code of the image data displayed on the kiosk. In many embodiments, the encryption key is stored in a cloud environment, similar to block 603 (FIG. 6, as described below). In various embodiments, the image data encrypted as a string of code can include organization data, facility identifiers (IDs), facility entrance IDs, kiosk IDs, the current time and date based on the UTC standard, a combination of any of the above data, and/or another related image data.

In several embodiments, the image data for the dynamic image or code can be encrypted in the cloud environment and pushed or transmitted to a kiosk during predetermined periods of time to refresh the dynamic image displayed on the kiosk on a regular basis. In various embodiments, the kiosk can make an API (Application Programming Interface) call to the cloud environment to update, pull or refresh the dynamic code before or simultaneously when the mobile application scans the image on the kiosk.

In several embodiments, method 400 further can include a block 404 of receiving, from the mobile device, image data of the image, as scanned by the mobile application from the kiosk, and mobile application data. In many embodiments, the image data can be saved in the cloud environment. For example, the image data can include (1) a visitor identification (ID) (2) an image (e.g., a QR code string) from the kiosk, (3) a current UTC timestamp from the mobile device, and (4) a meeting identification (ID) (e.g., meeting invitation) can be previously transmitted to a cloud environment. The cloud environment can receive the image data in block 603 (FIG. 6). In many embodiments, the visitor ID can identify the meeting that the visitor plans on attending at the location during a time period allotted for the duration of the meeting, and the meeting ID can identify the location of the facility and the location of the kiosk, as saved in the cloud environment.

In many embodiments, block 404 further can include transmitting the image data and the mobile application data to the cloud environment from the mobile application. As an example, the mobile application data can include one or more of visitor identification, information about the meeting at the facility including the date and time of the meeting, the duration of the meeting, and the name of the person at the facility who is hosting the meeting, etc. In many embodiments, the mobile application data can be encrypted by the mobile application before being transmitted to the cloud, and the encrypted mobile application data can be transmitted along with the encrypted image data to the cloud environment. The encryption key used by the mobile application to encrypt the mobile application data can be retrieved from the cloud environment, and this encryption key can be same as or different from the encryption key used by the kiosk to encrypt the image data. For example, a visitor can arrive at a facility and approach the location of the kiosk. At the kiosk location, the visitor opens the mobile application to select a scheduled meeting time displayed on the interface of the mobile device, and after the visitor selects the scheduled meeting, the mobile application can automatically turn on the camera on the mobile device. Then, the visitor can use the camera to scan the image on the kiosk without needing to physically touch or contact the kiosk and/or without interacting with any employee of the facility. In many embodiments, after the image is scanned by the camera on the mobile device (and at least temporarily saved on the mobile device), the mobile application on the mobile device can transmit the encrypted image data (e.g., QR data) and the encrypted mobile application data from the mobile device to the cloud environment.

In many embodiments, method 400 also can include a block 405 of decrypting, using a decryption key, the encrypted string of code of the image data of the image. In a number of embodiments, decrypting the encrypted string of code of the image data can be performed in the cloud environment using the decryption key, which can be a private decryption key, and afterwards, the cloud environment can validate the decrypted string of code of the image data. As an example, the decryption key can be related to (or the same as) the encryption key that the cloud environment previously sent to the kiosk and/or the mobile device to encrypt the image data and/or the mobile application data. Also, in some embodiments when the mobile application data is encrypted by the mobile application before being transmitted to the cloud, block 405 also can decrypt the mobile application data in the cloud using the same or different decryption key used to decrypt the string of code of the image data. In these embodiments, the mobile application data can be encrypted in or by the mobile device. In other embodiments, the mobile application sends the image data (e.g., QR code image) as is to the cloud, along with the visitor identification, which may or may not be encrypted, and does not encrypt or otherwise process the image data, which may or may not have been previously encrypted by the kiosk. The cloud can perform block 405.

For example, the visitor identification and/or other suitable data, can be encrypted on the mobile device using the encryption key in the cloud. The mobile application can send a request to the cloud environment for one or more encryption/decryption keys to encrypt and/or decrypt the mobile application data and/or the image data in or by the mobile device. In particular, when the mobile application scans the image data (e.g., QR code image) from the kiosk, the image data (e.g., QR code image) can have been previously encrypted by the kiosk using the encryption key, and the mobile application can (a) decrypt the image data and transmit the decrypted image data to the cloud environment or (b) transmit the kiosk-encrypted data to the cloud environment. In another embodiment, after the mobile application uses a decryption key from the cloud environment to decrypt the image data previously encrypted by the kiosk, the mobile application can encrypt the image data with a new encryption key from the cloud environment and transmit the newly encrypted image data to the cloud environment. In this embodiment, the mobile application can use the same new encryption key or a different encryption key from the cloud environment to encrypt the mobile application data to transmit the encrypted mobile application data to the cloud environment, or the mobile application can transmit the mobile application data in an unencrypted format to the cloud environment.

In various embodiments, method 400 further can include a block 406 of validating whether the mobile application data and the image data satisfy one or more criteria. The cloud environment also can perform block 406. In several embodiments, the one or more criteria can include validating that current date and time of the scanned image is within an acceptable range of time based on the date/time specified in the invitation (e.g., the user checking in is within the timeframe of the meeting in the invitation). An acceptable range of time can be one minute, two minutes, five minutes, or another suitable range of time. For example, in some embodiments, the user or visitor must check-in within a pre-determined time before the scheduled meeting time in the invitation or at least before the meeting time ends. Once the meeting time ends, the check-in option on the mobile application is disabled and is no longer available to be used. This disabling of the check-in option on the mobile application can be a security feature of the contactless check-in system and method.

In many embodiments, the one or more criteria also can include verifying that the user ID (e.g., visitor ID) generated by the mobile application exists within the system, and/or validating that the specific kiosk and location exists within the facility. In some embodiments, one or more criteria further can include flagging the user ID for a pre-determined reason, disabling or deactivating permission to the user (e.g., visitor) to enter the building by the system and/or another suitable criteria conducted by the system. For example, the cloud can verify the mobile application data to check whether the visitor ID exists in a backend system in a cloud environment. In several embodiments, validating whether the mobile application data and the image data satisfy the one or more criteria comprises confirming the invitation is valid. In many embodiments, determining the validity of the mobile application data and the image data can be performed in the cloud by verifying the date and time of the invitation. In a number of embodiments, the one or more criteria further comprises whether one or more of an identification of the kiosk or an identification of the facility matches one or more of kiosk information or facility information from the invitation. Other criteria of the one or more criteria can include verifying that the sender of the invitation is authorized to send the invitation. For example, if the sender of the invitation is no longer an employee at the facility, if the employee is out of office on the day or time of the meeting, or if the employee has another meeting calendared at the same day and time of the meeting, then the one or more criteria can determine that the invitation is not valid.

In some embodiments, method 400 additionally can include a block 407 of authorizing the user to access the facility. In many embodiments, authorizing the user to access the facility can include a single authorization to cover multiple invitations for multiple meetings on the same day at the same facility, thus eliminating the need to using the contactless check-in system again for each invitation in the same facility on the same day. In several embodiments, authorization to access the facility can be limited to the end time of a meeting of the invitation and/or the end time of the last meeting of the invitation.

In several embodiments, block 407 (and, thus, method 400) optionally can include a block 408 of transmitting to the mobile device a notification that the user is authorized to access the facility. In some embodiments, the cloud environment can transmit the authorization (for the user to access the facility) to the kiosk that, in turn, can transmit the notification to the mobile application of the mobile device of the user, similar to block 603 (FIG. 6, as described below). In other embodiments, the cloud environment can transmit the authorization (for the user to access the facility) to the mobile application of the mobile device of the user. In further embodiments, the cloud environment can simultaneously transmit the authorization to the mobile application of the mobile device of the user and to the kiosk. For example, the cloud environment sends the collective user or visitor information to the kiosk if the information is validated in the cloud, and the kiosk returns an acknowledgment to the user via the mobile application on the mobile device.

In many embodiments, block 407 (and, thus, method 400) optionally also can include a block 409 of transmitting removal instructions to the mobile application to prevent the mobile application from being used again to check-in at the facility. In several embodiments, removal instructions can include removing an invitation from the mobile application, inactivating the invitation, and/or other suitable methods to prevent unauthorized use of the invitation for the user. For example, once a visitor is checked in and the contactless check-in process is completed, the check-in option on the mobile application on the user device is no longer valid or accessible (i.e., no longer appears on the mobile application). The transmittal of the removal instructions can occur from the cloud to the kiosk to the mobile application on the user device, or from the cloud to the mobile application on the user device.

In a number of embodiments, block 407 (and, thus, method 400) optionally further can include a block 410 of transmitting printing instructions to a printer to print a check-in badge for the user, similar to block 604 (FIG. 6, as described below). In some embodiments, the cloud environment can transmit the printing instructions to the kiosk that in turn transmits the instructions to a printer located in the facility near the entrance where the kiosk is located to allow the user to retrieve a check-in or visitor badge to gain access to the facility. For example, the kiosk pairs with a printer, and the printer can print a "visitor's label" or "badge" for the user, signifying authorized access to the facility and the meeting. In many embodiments, an advantage of the label or badge is that it can be worn visibly in the facility for the meeting and the duration of time in the facility. Such a printed label or badge can also be designed to include a record of the access to the facility and/or a tracking device to ensure the whereabouts of the user or visitor is secure at all times while in the facility. For example, the check-in badge can include printed information, such as a name of the visitor, a name of the host employee, an authorized date/time/duration of a meeting, a location of the facility, a time-stamp, a logo of an organization, a 2D barcode or QR code that can also be used to validate the visitor's label or badge, and/or other such identifying information.

In many embodiments, block 410 (and, thus, method 400) additionally can include receiving instructions from the kiosk to print a badge for the user located at the facility. In some embodiments, the printer can be located near the kiosk or the facility entrance to print the check-in badge for the user. In various embodiments, the printer can be located behind a secured area within a secured facility when an additional security measure requires a confirmation of the identification of the visitor matching the check-in badge by an authorized person. For example, such additional security measures when in place can include another procedure before the visitor can receive the printed visitor's label or badge such as the authorized person confirming a government identification of the visitor matches the information printed on the visitor's label or badge prior to handing the label or badge to the visitor. In several embodiments, the printer can include printing a photographic image of the user on the check-in badge along with other information such as the expiration date and time, limiting the user's authorization to be in the facility. Upon exiting the facility, the user can return and/or securely discard the printed badge prior to leaving the facility.

Figure 5:
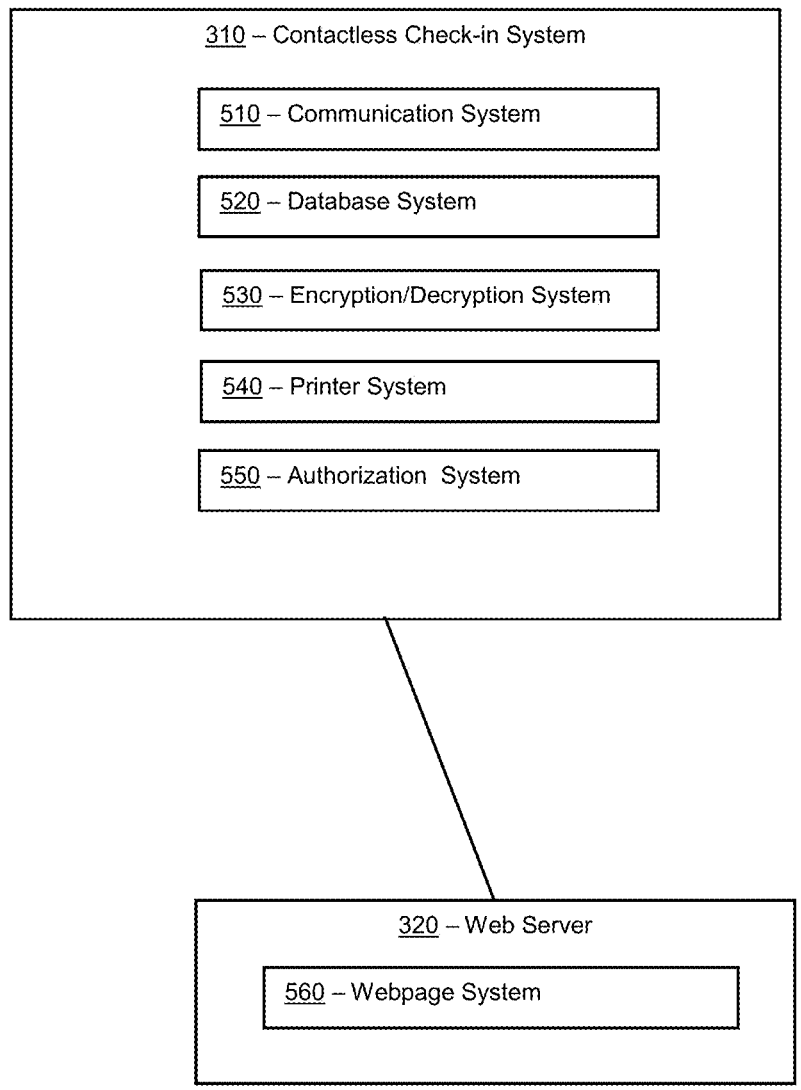
FIG. 5 illustrates a representative block diagram for a system of FIG. 3 according to another embodiment.

Turning to the next drawing, FIG. 5 illustrates a block diagram of system 300, according to the embodiment shown in FIG. 3. Contactless check-in system 310 and/or web server 320 are merely exemplary and are not limited to the embodiments presented herein. Contactless check-in system 310 and/or web server 320 can be employed in many different embodiments or examples not specifically depicted or described herein. In some embodiments, certain elements or systems of contactless check-in system 310 and/or web server 320 can perform various procedures, processes, and/or acts. In other embodiments, the procedures, processes, and/or acts can be performed by other suitable elements or systems. In many embodiments, the systems of contactless check-in system 310 and/or web server 320 can be modules of computing instructions (e.g., software modules) stored at non-transitory computer readable media. In the same or different embodiments, the systems of contactless check-in system 310 and/or web server 320 can be implemented in hardware.

In many embodiments, contactless check-in system 310 can include a communication system 510. In a number of embodiments, communication system 510 can at least partially perform: block 401 (FIG. 4) of transmitting an invitation to a mobile application on a mobile device of a user; block 404 (FIG. 4) of receiving, from the mobile device, image data of the image, as scanned by the mobile application from the kiosk, and mobile application data; block 408 (FIG. 4) of transmitting to the mobile device a notification that the user is authorized to access the facility; block 409 (FIG. 4) of transmitting removal instructions to the mobile application to prevent the mobile application from being used to check-in at the facility; block 410 (FIG. 4) of transmitting printing instructions to a printer to print a check-in badge for the user; and/or block 603 (FIG. 6, described below) of receiving the image data from the QR code and the mobile application data from the mobile device to a cloud environment. The transmissions to and/or from communication system 510 (such as with the mobile device of the user and/or with the kiosk) can occur via web server 320.

In several embodiments, contactless check-in system 310 also can include a database system 520. In various embodiments, database system 520 can at least partially perform block 406 (FIG. 4) of validating whether the mobile application data and the image data satisfy one or more criteria.

In various embodiments, contactless check-in system 310 further can include an encryption/decryption system 530. In several embodiments, encryption/decryption system 530 can at least partially perform: block 402 (FIG. 4) of generating, by a visitor application, an image that is displayed on a kiosk at an entrance of the facility; block 403 (FIG. 4) of encrypting, using an encryption key, a string of code of the image data displayed on the kiosk; and/or block 405 (FIG. 4) of upon receiving the image data, decrypting, using a decryption key, an encrypted string of code of the image data of the image.

In a number of embodiments, contactless check-in system 310 also can include a printer system 540. Printer system 540 can at least partially perform block 410 (FIG. 4) of transmitting printing instructions to a printer to print a check-in badge for the user, and/or block 604 (FIG. 6, described below) of receiving instructions from the kiosk to print a badge for the user located at the facility.

In many embodiments, contactless check-in system 310 additionally can include an authorization system 550. Authorization system 550 can at least partially perform block 407 (FIG. 4) of when the one or more criteria are satisfied, authorizing the user to access the facility.

In several embodiments, web server 320 can include a webpage system 560. In some embodiments, contactless check-in system 310 can include webpage system 560.

In many embodiments, webpage system 560 can refer to the presentation of webpages or the user interface to a visitor on a kiosk system. Webpage system 560 can request information from one or more other parts of web server 320, the requested information can include the encrypted image data (e.g., QR code data). In these embodiments, contactless check-in system 310 can send and retrieve information from web server 320 without performing other substantial logic (e.g., substantial computer processes) independently or on its own. In these embodiments, contactless check-in system 310 can be similar to what is known in the industry as a dummy terminal.

Webpage system 560 can at least partially perform sending instructions to user computers (e.g., 350-351 (FIG. 3)) based on information received from communication system 510, and/or receiving instructions from the user computers. Webpage system 560 also can be configured to communicate with the mobile application on the mobile device of the user.

Turning ahead in the drawings, FIG. 6 illustrates a flow chart of method 3, according to another embodiment. Method 600 can be similar to method 400 (FIG. 4), and various procedures, processes, and/or activities of method 600 can be similar or identical to various procedures, processes, and/or activities of method 600 (FIG. 6). Method 600 can be employed in many different embodiments and/or examples not specifically depicted or described herein. In some embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as contactless check-in system 310 and/or web server 320. The processor(s) can be similar or identical to the processor(s) described above with respect to computer system 100 (FIG. 1).

Referring to FIG. 6, in various embodiments, method 600 can include a block 601 of receiving a scan from a mobile application, similarly as implemented in block 404 (FIG. 4). In various embodiments, receiving the scan from the mobile application can include (or can occur after) downloading the mobile application on a mobile device of a user (e.g., an invited visitor) to enable the mobile device to scan the image, similarly as implemented in block 401 (FIG. 4).

In many embodiments, method 600 also can include a block 602 of displaying an image on a kiosk. In several embodiments, displaying the image can include using a visitor application to automatically generate, update, or refresh the image displayed on the kiosk, similarly implemented in block 402 (FIG. 4) and similarly shown on exemplary user interface display 701 (FIG. 7 described below).

In various embodiments, method 600 additionally can include a block 603 of receiving the image data from the image (which can be a QR code) and also receiving the mobile application data from the mobile device, all in a cloud environment, similarly implemented in block 404 (FIG. 4). In many embodiments, validation of the image data and the mobile application data can occur in the cloud environment, similarly implemented in block 406 (FIG. 4). In some embodiments, authorizing the user to access the facility can include transmitting the authorization from the cloud environment to the kiosk, similarly implemented in block 407 (FIG. 4). Block 603 also can encrypt a string of code for the image and decrypt the encrypted string of code, as similarly implemented in blocks 403 and 405 (FIG. 4).

Block 603 can further transmit to the mobile device a notification and/or removal instructions, as similarly implemented in blocks 408 and 409 (FIG. 4).

In several embodiments, method 600 further can include a block 604 of receiving instructions from the kiosk to print a badge for the user located at the facility, similarly implemented by block 410 (FIG. 4).

Turning ahead in the drawings, FIG. 7 illustrates an exemplary user interface display 701 showing a display of a kiosk. User interface display 701 is merely exemplary, and embodiments of the contactless check-in system can be employed in many different embodiments or examples not specifically depicted or described herein. In a number of embodiments, the display of the kiosk can be a homepage of the kiosk, and can provide an option for a contactless check-in experience for a user by displaying an image that can be scanned by a mobile device, similarly as implemented in block 402 (FIG. 4). User interface display 701 shows an image of an interactive QR code, but this image of an interactive QR code is merely exemplary, and the embodiments of the image can be employed in many different embodiments or examples not specifically depicted or described herein. In several embodiments, the homepage of the kiosk also can provide a conventional manual method to check-in to the facility by using an interactive icon displayed adjacent to the contactless check-in image. In some embodiments, a conventional manual method to check-in to the facility can allow a user (e.g., visitor) with and/or without an invitation to use the manual method to contact the employees of the facility upon arrival. As shown in FIG. 7, this conventional manual method to check-in is shown by the "Check-in" button to the left of the QR code.

In many embodiments, an advantage of using an automated contactless check-in system is that such a system provides a technological improvement over the conventional check-in methods which were based on manual interaction with a kiosk homepage and/or interaction with an employee of the facility. In this example, the only "contact" used for this automated contactless check-in system was conducted by the visitor using the mobile application opened on the mobile device of the visitor. Such a contactless system of using the same kiosk effectively increases the speed at which the invitation and the user could be validated using backend systems and processes.

In some embodiments, another advantage of using a contactless check-in system, as a whole, is that it can process the check-in system and the current time and date updates faster due to the cloud environment computers and processes, which can perform faster updates and verifications on certain authorized users and visitors qualifying for access to a facility. Further, in some embodiments, the computer processing time for check-in can be performed in near real time, instead of waiting for human interaction and/or intervention.

In several embodiments, another advantage of the contactless check-in system is related to improved security in view of the multiple ways an invitation can be disabled or removed to prevent the mobile application or the invitation from being used to check-in at the facility on another date or time, at a different facility at any time, and/or at a different entrance of a facility at any time. In various embodiments, an additional advantage of the contactless check-in system is the ability to disable the mobile application if the contactless check-in system detects fraud.

In many embodiments, the techniques described herein can provide several technological improvements. In some embodiments, the techniques described herein can provide for automatically checking in a visitor to a facility using a contactless check-in system. In many embodiments, the techniques described herein can beneficially make determinations based on real-time information from current image data and mobile data for each invitation and each meeting time. In a number of embodiments, the techniques described herein can advantageously enable efficient utilization of a contactless check-in system, such as contactless check-in system 310 (FIGS. 3 and 6), by dynamically creating an image on a kiosk that can be used based on one or more qualifying conditions in real time when authorization to access the facility is requested by users, such as users 350-351 (FIG. 3), which can beneficially result in a reduction in processor use and memory cache.

In many embodiments, the techniques described herein can be used continuously at a scale that cannot be handled using manual techniques. For example, the number of daily and/or monthly visits to a facility can exceed approximately ten thousand and/or other suitable numbers, the number of users with valid invitations can exceed approximately one million and/or other suitable numbers, each week, month, or year, depending on the facility.

In a number of embodiments, the techniques described herein can solve a technical problem that arises only within the realm of computer networks, as determining whether automatically authorize a visitor to a facility using a contactless check-in system does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because part of the techniques described herein would not exist without a contactless check-in system.

Various embodiments can include a system including one or more processors and one or more non-transitory computer-readable media storing computing instructions configured to run on the one or more processors and perform certain acts. The acts can include transmitting an invitation to a mobile application on a mobile device of a user. The invitation authorizes the mobile application on the mobile device to be used to check-in to a facility. The acts also can include generating, by a visitor application, an image that is displayed on a kiosk at an entrance of the facility. The acts further can include receiving, from the mobile device, image data of the image, as scanned by the mobile application from the kiosk, and mobile application data. The acts additionally can include validating whether the mobile application data and the image data satisfy one or more criteria. When the one or more criteria are satisfied, the acts also can include authorizing the user to access the facility.

A method being implemented via execution of computing instructions configured to run on one or more processors and stored at one or more non-transitory computer-readable media. The method can include transmitting an invitation to a mobile application on a mobile device of a user. The invitation authorizes the mobile application on the mobile device to be used to check-in to a facility. The method also can include generating, by a visitor application, an image that is displayed on a kiosk at an entrance of the facility. The method further can include receiving, from the mobile device, image data of the image, as scanned by the mobile application from the kiosk, and mobile application data. The method additionally can include validating whether the mobile application data and the image data satisfy one or more criteria. When the one or more criteria are satisfied, the method also can include authorizing the user to access the facility.

Although automatically authorizing a user to access a facility using a contactless check-in system has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 3-7 may include different procedures, processes, and/or activities and be performed by many different modules, in many different orders, and/or one or more of the procedures, processes, or activities of FIGS. 3-7 may include one or more of the procedures, processes, or activities of another different one of FIGS. 3-7. As another example, the systems within contactless check-in system 310 and webserver 320, (see FIGS. 3 and 5), can be interchanged or otherwise modified. Additional portions of contactless check-in system 310 and webserver 320, (see FIGS. 3 and 5) also can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A system comprising:
   one or more processors; and
   one or more non-transitory computer-readable media storing computing instructions that when executed on the one or more processors, cause the one or more processors to perform functions comprising:
      receiving at least one invitation from at least one authorized user inviting a first user to visit at least one facility during a respective period of time;
      transmitting the at least one invitation to a mobile application on a mobile device of the first user, wherein the at least one invitation authorizes the mobile application on the mobile device to be used to check-in to the at least one facility for the respective period of time, and wherein the at least one invitation expires at an end of the respective period of time and can no longer be used to check-in to the at least one facility;

generating, by a visitor application, an image that is displayed on a kiosk at an entrance of the at least one facility;

receiving, from the mobile device, (a) image data of the image, as scanned by the mobile application from the kiosk, and (b) other data from the mobile application;

validating whether the other data from the mobile application and the image data satisfy one or more criteria; and when the one or more criteria are satisfied, authorizing the first user to access the at least one facility.

2. The system of claim 1, wherein:

the invitation is displayed on an interface of the mobile application on the mobile device in at least one or more presentations comprising:

highlighted on the interface indicating the invitation is valid at a point in time;

dimmed from the interface indicating an expired period of time associated with the invitation;

crossed-out from the interface indicating the expired period of time associated with the invitation;

removed from the interface indicating the expired period of time associated with the invitation;

expressed as an icon symbolizing (a) the expired period of time associated with the invitation or (b) an invalid invitation;

a code indicating the invitation is valid after scanning the code at the kiosk; or another code indicating the invitation is invalid after scanning the code at the kiosk.

3. The system of claim 1, wherein the computing instructions, when executed on the one or more processors, further cause the one or more processors to and perform a function comprising at least one of:

encrypting, using an encryption key, a string of code of the image data displayed as part of the image on the kiosk; or upon receiving the image data, decrypting, using a decryption key, an encrypted string of code of the image data of the image.

4. The system of claim 1, wherein:

the first user first accesses the invitation at the time the first user downloads the mobile application to the mobile device.

5. The system of claim 1, wherein after the first user is authorized to access the at least one facility, transmitting removal instructions to the mobile application to prevent the mobile application on the mobile device from being used to check-in at the at least one facility.

6. The system of claim 1, wherein authorizing the first user to access the at least one facility further comprises at least one of:

transmitting to the mobile device a notification that the first user is authorized to access the at least one facility; or transmitting printing instructions to a printer to print a check-in badge for the first user.

7. The system of claim 1, wherein the image comprises a dynamic image that is automatically generated and updated by the visitor application for display on the kiosk.

8. The system of claim 1, wherein the image data of the image comprises one or more of a current date, a current time, an identification of the kiosk, and an identification of the at least one facility.

9. The system of claim 8, wherein the one or more criteria comprise whether one or more of the identification of the kiosk or the identification of the at least one facility matches one or more of information about the kiosk or information about the at least one facility from the at least one invitation.

10. The system of claim 1, wherein validating whether the other data from the mobile application and the image data satisfy the one or more criteria comprises confirming the at least one invitation is valid.

11. A method being implemented via execution of computing instructions configured to run on one or more processors and stored at one or more non-transitory computer-readable media, the method comprising:

receiving at least one invitation from at least one authorized user inviting a first user to visit at least one facility during a respective period of time;

transmitting the at least one invitation to a mobile application on a mobile device of the first user, wherein the at least one invitation authorizes the mobile application on the mobile device to be used to check-in to the at least one facility for the respective period of time, and wherein the at least one invitation expires at an end of the respective period of time and can no longer be used to check-in to the at least one facility;

generating, by a visitor application, an image that is displayed on a kiosk at an entrance of the at least one facility;

receiving, from the mobile device, (a) image data of the image, as scanned by the mobile application from the kiosk, and (b) other data from the mobile application;

validating whether the other data from the mobile application and the image data satisfy one or more criteria; and when the one or more criteria are satisfied, authorizing the first user to access the at least one facility.

12. The method of claim 11, wherein:

the invitation is displayed on an interface of the mobile application on the mobile device in at least one or more presentations comprising:

highlighted on the interface indicating the invitation is valid at a point in time;

dimmed from the interface indicating an expired period of time associated with the invitation;

crossed-out from the interface indicating the expired period of time associated with the invitation;

removed from the interface indicating the expired period of time associated with the invitation;

expressed as an icon symbolizing (a) the expired period of time associated with the invitation or (b) an invalid invitation;

a code indicating the invitation is valid after scanning the code at the kiosk; or another code indicating the invitation is invalid after scanning the code at the kiosk.

13. The method of claim 11, further comprising at least one of:

encrypting, using an encryption key, a string of code of the image data displayed as part of the image on the kiosk; or upon receiving the image data, decrypting, using a decryption key, an encrypted string of code of the image data of the image.

14. The method of claim 11, wherein:

the first user first accesses the invitation at the time the first user downloads the mobile application to the mobile device.

15. The method of claim 11, wherein after the first user is authorized to access the at least one facility, transmitting removal instructions to the mobile application to prevent the mobile application on the mobile device from being used to check-in at the at least one facility.

16. The method of claim 11, wherein authorizing the first user to access the at least one facility further comprises at least one of:
- transmitting to the mobile device a notification that the first user is authorized to access the at least one facility; or
- transmitting printing instructions to a printer to print a check-in badge for the first user.

17. The method of claim 11, wherein the image comprises a dynamic image that is automatically generated and updated by the visitor application.

18. The method of claim 11, wherein the image data of the image comprises a current date, a current time, an identification of the kiosk, and an identification of the at least one facility.

19. The method of claim 18, wherein the one or more criteria comprise whether one or more of the identification of the kiosk or the identification of the at least one facility matches one or more of information about the kiosk or information about the at least one facility from the at least one invitation.

20. The method of claim 11, wherein validating whether the other data from the mobile application and the image data satisfy the one or more criteria comprises confirming the at least one invitation is valid.

* * * * *